US010536680B2

(12) United States Patent
Kuriyama

(10) Patent No.: US 10,536,680 B2
(45) Date of Patent: Jan. 14, 2020

(54) IMAGING DEVICE

(71) Applicant: NIKON CORPORATION, Tokyo (JP)

(72) Inventor: Takashi Kuriyama, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/104,260

(22) Filed: Aug. 17, 2018

(65) Prior Publication Data
US 2018/0359455 A1      Dec. 13, 2018

Related U.S. Application Data

(63) Continuation of application No. 15/214,850, filed on Jul. 20, 2016, now Pat. No. 10,085,000, which is a (Continued)

(30) Foreign Application Priority Data

May 25, 2010    (JP) ................................ 2010-119424

(51) Int. Cl.
H04N 5/77        (2006.01)
H04N 9/79        (2006.01)
(Continued)

(52) U.S. Cl.
CPC ........... H04N 9/79 (2013.01); H04N 5/23245 (2013.01); H04N 5/2621 (2013.01); H04N 5/772 (2013.01); H04N 9/8042 (2013.01); H04N 5/907 (2013.01)

(58) Field of Classification Search
CPC .... H04N 9/79; H04N 9/8042; H04N 5/23245; H04N 5/2621; H04N 5/772; H04N 5/907
(Continued)

(56) References Cited

U.S. PATENT DOCUMENTS 6,347,186 B2    2/2002   Watanabe
7,496,211 B2    2/2009   Yamagami et al.
(Continued)

FOREIGN PATENT DOCUMENTS

CN      1209622 A     3/1999
CN      1664859 A     9/2005
(Continued)

OTHER PUBLICATIONS

Nov. 5, 2018 Office Action issued in Chinese Application No. 201410662985.4.
(Continued)

*Primary Examiner* — Robert Chevalier
(74) *Attorney, Agent, or Firm* — Oliff PLC

(57) ABSTRACT

An imaging device includes an imaging sensor that outputs an imaging signal representing a sequence of frame images of a photographic subject. A buffer memory temporarily stores data of the sequence of frame images from the imaging signal. A release switch is actuated by a user to output an image-taking signal. A controller, upon receipt of the image-taking signal from the release switch: (i) generates moving image data from at least some of the plurality of frame images stored in the buffer memory, (ii) generates at least one piece of still image data based on at least one frame image of the plurality of frame images stored in the buffer memory, and (iii) associates the moving image data with the still image data and records the moving image data and the still image data in a recording medium.

11 Claims, 6 Drawing Sheets

Related U.S. Application Data continuation of application No. 13/796,742, filed on Mar. 12, 2013, now abandoned, which is a continuation of application No. 13/093,557, filed on Apr. 25, 2011, now Pat. No. 8,422,868.

(51) Int. Cl.
*H04N 5/232* (2006.01)
*H04N 9/804* (2006.01)
*H04N 5/262* (2006.01)
*H04N 5/907* (2006.01)

(58) Field of Classification Search
USPC ....... 386/248, 239, 224, 223, 210, 227, 291, 386/326, 225
See application file for complete search history.

(56) References Cited

U.S. PATENT DOCUMENTS

| | | | |
|---|---|---|---|
| 8,422,868 | B2 | 4/2013 | Kuriyama |
| 8,451,372 | B2 * | 5/2013 | Oshima .................... G03B 7/08 348/363 |
| 2001/0002223 | A1 | 5/2001 | Watanabe |
| 2001/0031127 | A1 | 10/2001 | Honjo |
| 2003/0052986 | A1 | 3/2003 | Matsumoto |
| 2004/0027593 | A1 | 2/2004 | Wilkins |
| 2005/0163492 | A1 | 7/2005 | Ueda et al. |
| 2005/0237422 | A1 | 10/2005 | Kido |
| 2005/0281536 | A1 | 12/2005 | Aiso et al. |
| 2006/0238620 | A1 | 10/2006 | Asada et al. |
| 2006/0262211 | A1 * | 11/2006 | Kido .................. H04N 5/23245 348/308 |
| 2008/0109729 | A1 | 5/2008 | Notea et al. |
| 2008/0219640 | A1 | 9/2008 | Tanabe |
| 2009/0135252 | A1 | 5/2009 | Matsuda et al. |
| 2009/0303339 | A1 * | 12/2009 | Kudo .................. H04N 5/2171 348/222.1 |
| 2009/0309988 | A1 | 12/2009 | Kubo et al. |
| 2010/0260472 | A1 | 10/2010 | Okada |

FOREIGN PATENT DOCUMENTS

| | | |
|---|---|---|
| JP | 2002-084442 A | 3/2002 |
| JP | 2003-092724 A | 3/2003 |
| JP | 2004-007543 A | 1/2004 |
| JP | 2005-136754 A | 5/2005 |
| JP | 2005-311665 A | 11/2005 |
| JP | 2006-064739 A | 3/2006 |
| JP | 2007-180740 A | 7/2007 |
| JP | 2008-022081 A | 1/2008 |
| JP | WO2006/085500 A1 | 6/2008 |
| JP | 2010-113729 A | 5/2010 |
| KR | 10-2007-0057820 A | 6/2007 |
| WO | 2006/028172 A1 | 3/2006 |

OTHER PUBLICATIONS

Sep. 12, 2012 Office Action issued in U.S. Appl. No. 13/093,557.
Jan. 18, 2013 Notice of Allowance issued in U.S. Appl. No. 13/093,557.
Jul. 1, 2013 Office Action issued in Chinese Patent Application No. 201110136442.5.
Dec. 3, 2013 Office Action issued in Chinese Patent Application No. 201110136442.5.
Feb. 25, 2014 Office Action issued in Japanese Patent Application No. 2012-088921.
Sep. 2, 2014 Office Action issued in Japanese Patent Application No. 2012-088921.
Jul. 14, 2014 Office Action issued in U.S. Appl. No. 13/796,742.
Feb. 4, 2015 Office Action issued in U.S. Appl. No. 13/796,742.
Aug. 20, 2015 Office Action issued in U.S. Appl. No. 13/796,742.
Feb. 25, 2016 Office Action issued in U.S. Appl. No. 13/796,742.
Apr. 28, 2017 Office Action Issued in U.S Appl. No. 15/214,850.
Mar. 1, 2017 Office Action issued in Chinese Patent Application No. 201410663195.8.
Mar. 2, 2017 Office Action issued in Chinese Patent Application No. 201410662985.4.
Mar. 2, 2017 Office Action issued in Korean Patent Application No. 10-2011-0047199.
Nov. 22, 2017 Office Action Issued in U.S. Appl. No. 15/214,850.
Oct. 31, 2017 Office Action issued in Chinese Application No. 201410662985.4.
Apr. 2, 2018 Office Action issued in Korean Application No. 10-2018-0012612.
May 15, 2018 Office Action issued in Chinese Patent Application No. 201410663195.8.
Jun. 20, 2019 Office Action issued in Chinese Patent Application No. 201410662985.4.

\* cited by examiner

IMAGING DEVICE

CROSS-REFERENCE TO RELATED APPLICATIONS

This is a continuation of U.S. patent application Ser. No. 15/214,850 filed on Jul. 20, 2016, which is a continuation of U.S. patent application Ser. No. 13/796,742 filed Mar. 12, 2013, which in turn is a continuation of U.S. patent application Ser. No. 13/093,557 filed Apr. 25, 2011 (now U.S. Pat. No. 8,422,868), the disclosure of which is incorporated by reference herein in its entirety. The disclosure of the following priority application also is incorporated hereby reference in its entirety:

Japanese Patent Application No. 2010-119424, filed on May 25, 2010.

TECHNICAL FIELD

The present invention relates to an imaging device that can record a moving image.

BACKGROUND ART

A recording device is proposed in which a moving image starts to be temporarily stored when moving image-incorporated still image capturing mode is set; and a captured still image is recorded and a moving image is generated from any one of the following moving images and recorded when a shutter button is pressed: a moving image that has been temporarily stored before the still image is captured, a moving image converted from the captured still image, and a moving image captured after the shutter button is pressed (refer to, for example, WO2006/028172).

SUMMARY OF INVENTION

However, in regard to known imaging devices equipped with the recording device disclosed in WO2006/028172, no technology is disclosed in which a moving image having an impressive digital video effect such as a slow motion moving image where a subject appears to move more slowly than actual movement is captured in synchronization with the timing at which the still image is captured, and the moving image and the still image are associated with each other and recorded.

An object of the invention is to provide an imaging device capable of capturing a slow motion moving image with high resolution and extreme precision in an automatic manner, in relation with timing of capturing a still image with high resolution and extreme precision.

An imaging device according to the invention includes a storage unit that sequentially stores a plurality of frame images based on an imaging signal from an imaging sensor that images light from a subject, a moving image data generation unit that generates slow motion moving image data to be played at a second frame rate lower than a first frame rate that represents the number of the frame images stored per unit time in the storage unit, based on the plurality of frame images stored in the storage unit for a predetermined time period, a still image data generation unit that generates at least one piece of still image data based on at least one frame image of the plurality of frame images stored during the predetermined time period in the storage unit, and a record control unit that associates the slow motion moving image data generated by the moving image data generation unit with the still image data generated by the still image data generation unit and records the moving image data and the still image data in a recording medium.

According to the imaging device of the invention, it is possible to capture the slow motion moving image with high resolution and extreme precision and to capture the still image with high resolution and extreme precision in parallel, at synchronized timing.

DESCRIPTION OF EMBODIMENTS

Figure 1:
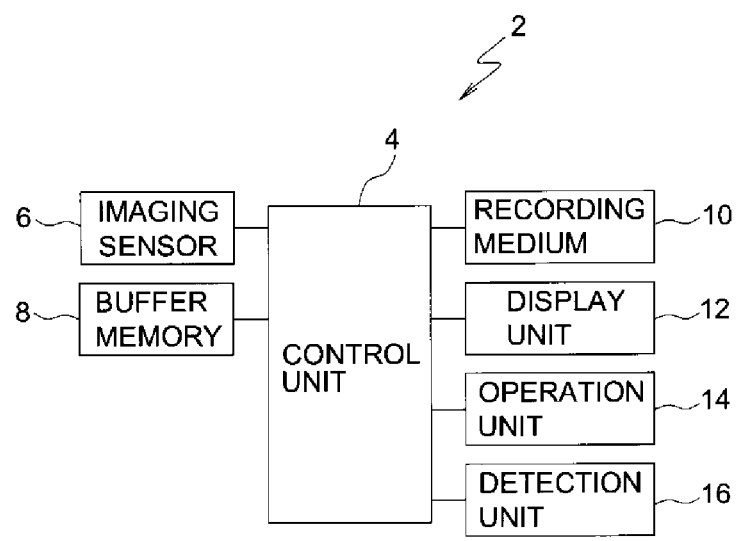
FIG. 1 is a block diagram illustrating a system configuration of an electronic camera according to an embodiment.

Hereafter, an electronic camera as an imaging device according to an embodiment of the present invention will be described with reference to the accompanying drawings. FIG. 1 is a block diagram illustrating a system configuration of an electronic camera 2 according to a first embodiment. As illustrated in FIG. 1, the electronic camera 2 is configured by a microprocessor and the like. The electronic camera 2 includes a control unit 4 that collectively controls over respective units of the electronic camera 2. The control unit 4 is connected with an imaging sensor 6, a buffer memory 8, a recording medium 10, a display unit 12, an operation unit 14, and a detection unit 16.

The imaging sensor 6 is configured by a CCD, CMOS or the like, and images light from a subject through an image-capturing lens (not shown). The control unit 4 acquires image data based on an imaging signal that is a digital signal obtained by converting an analog signal output from the imaging sensor 6 using an A/D converter (not shown).

The buffer memory 8 temporarily stores image data produced based on the imaging signal from the imaging sensor 6. In particular, when the electronic camera 2 is set, for example, to slow motion moving image capturing mode or the like in which a slow motion moving image (to be described below and also referred to as a slow moving image hereinafter) is captured, the buffer memory 8 sequentially stores a plural number of pieces of image data based on the imaging signal output from the imaging sensor 6 in synchronization with a moving image cycle (60 fps or the like), that is, a plurality of frame images constituting the slow moving image. In this case, the frame images, each having the number of pixels matching or exceeding the standard (1280×720 pixels or more) of high definition television (HDTV), that is, so-called high resolution frame images are sequentially stored in the buffer memory 8 in a first-in first-out (FIFO) manner.

Figure 2:
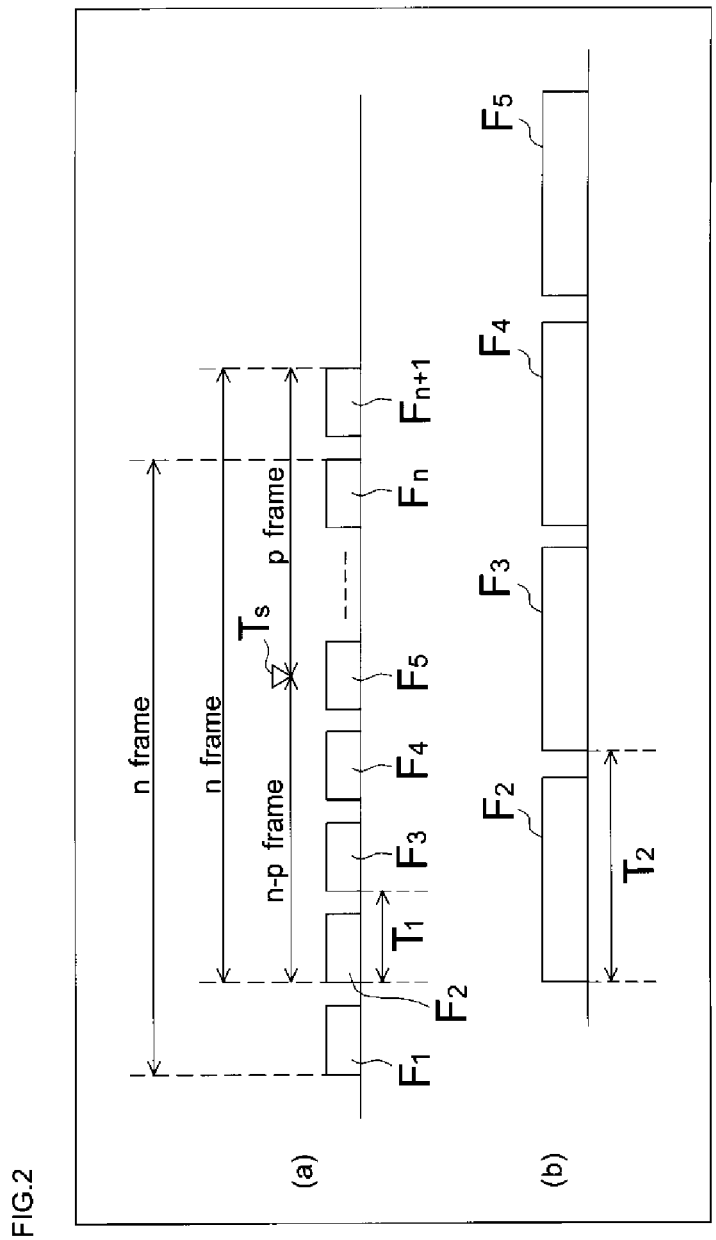
FIG. 2 is an explanatory diagram illustrating a frame rate for storing a slow motion moving image in a buffer memory and a frame rate for recording the slow motion moving image in a recoding medium at the time of capturing the slow motion moving image.

More specifically, in a case where the buffer memory 8 has a storage area that is allowed to store, for example, n (n is a natural number) frame images, as illustrated in FIG. 2(*a*), the control unit 4 performs control such that a first frame image F1 obtained through a first acquisition, a second frame image F2 obtained through a second acquisition, . . . , and an n-th frame image Fn obtained through an n-th acquisition are sequentially stored in the buffer memory 8. In a case where a subsequent frame image Fn+1 is output from the imaging sensor 6 after n frame images F1 to Fn are stored in this way, the oldest frame image F1 is removed from the buffer memory 8 and the newest frame image Fn+1 is stored instead. Whenever a subsequent frame image is output from the imaging sensor 6, a process of removing the oldest frame image and storing the newest frame image is repeatedly performed.

That is, the buffer memory 8 includes n addresses (storage areas to sequentially store the frame images), and stores sequentially the first frame image F1 in an address of address number (n−1), the second frame image F2 in an address of address number (n−2), . . . , and the n-th frame image Fn in an address of address number 0. That is, the frame images F1 to Fn are stored in all of the n addresses, the subsequent frame image Fn+1 is output, and the frame image (that is, the oldest frame image) F1 in the address of address number (n−1) is deleted. Then, the respective frame images F2 to Fn are shifted from the addresses of address number (n−2) to address number 0 so as to be stored in the addresses of address number (n−1) to address number 1, respectively, and the (n+1)-th frame image (that is, the newest frame image) Fn+1 is stored in the address of address number (0). Accordingly, the newest frame image is always stored in the address of address number (0), and the address with the greater address number stores the older frame image. The address with address number 0 stores the newest frame image at all times.

The recording medium 10 is a potable type recording medium that is removably installed in a card slot (not shown) provided in the electronic camera 2. For example, a CF card, an SD card, a smart media, or the like is used as the recording medium. In the recording medium 10, moving image data and slow moving image data are recorded. The moving image data and the slow moving image data are produced by subjecting each of the frame images stored in the buffer memory 8 to a resizing process (resizing from a high resolution to a low resolution) to achieve a resolution suitable for a moving image, which is performed by a reduction circuit (not shown) in the control unit 4, a moving-image image process performed by a moving image signal processing circuit (not shown) in the control unit 4, and a moving image compression process performed by a moving image compression circuit (not shown) in the control unit 4. In the recording medium 10, information related to image-capturing and still image data are also recorded. The still image data is obtained by subjecting the frame image stored in the buffer memory 8 to a still-image image process performed by a still image signal processing circuit (not shown) in the control unit 4 and a still image compression process performed by a still image compression circuit (not shown) in the control unit 4.

The display unit 12 is configured by a monitor including an LCD and the like provided on the rear surface of the electronic camera 2, or an EVF or the like including an LCD and the like. The display unit 12 displays a through image based on the imaging signal from the imaging sensor 6, a moving image based on the moving image data recorded in the recording medium 10, a slow moving image based on the slow motion moving image data (hereinafter, referred to as slow moving image data), a still image based on the still image data, and information related to the image-capturing. The operation unit 14 is configured by including a power supply switch operated for turning on/off the power supply of the electronic camera 2, a command dial operated for setting image-capturing mode such as moving image capturing mode for capturing a moving image or slow motion moving image capturing mode for capturing a slow moving image, a release button operated for entering instructions such as an instruction to start capturing of a moving image or a still image, a menu button operated for displaying menu items or the like on the display unit 12, a cross key operated for selection of a menu item or the like or for setting various conditions, an OK button operated for confirmation of the operation such as selection of a menu item or setting of various conditions, and the like.

The detection unit 16 is configured by including an attitude sensor and the like and detects information related to a change in the attitude of the electronic camera 2 relative to a subject at the time of capturing the slow moving image in the electronic camera 2. The control unit 4 controls an ending time of the capturing of the slow moving image based on the detection result from the detection unit 16. Instead of including the attitude sensor, the detection unit 16 may be configured by employing a structure that detects information related to a change in the attitude of the electronic camera 2 by detecting a change in movement of a subject, based on at least two frame images having a resolution suitable for the detection of attitude change of the electronic camera 2, at first which are produced based on the imaging signal from the imaging sensor 6 and then subjected to a resizing process (resizing from a high resolution to a low resolution) performed by the reduction circuit (not shown) in the control unit 4.

Figure 3:
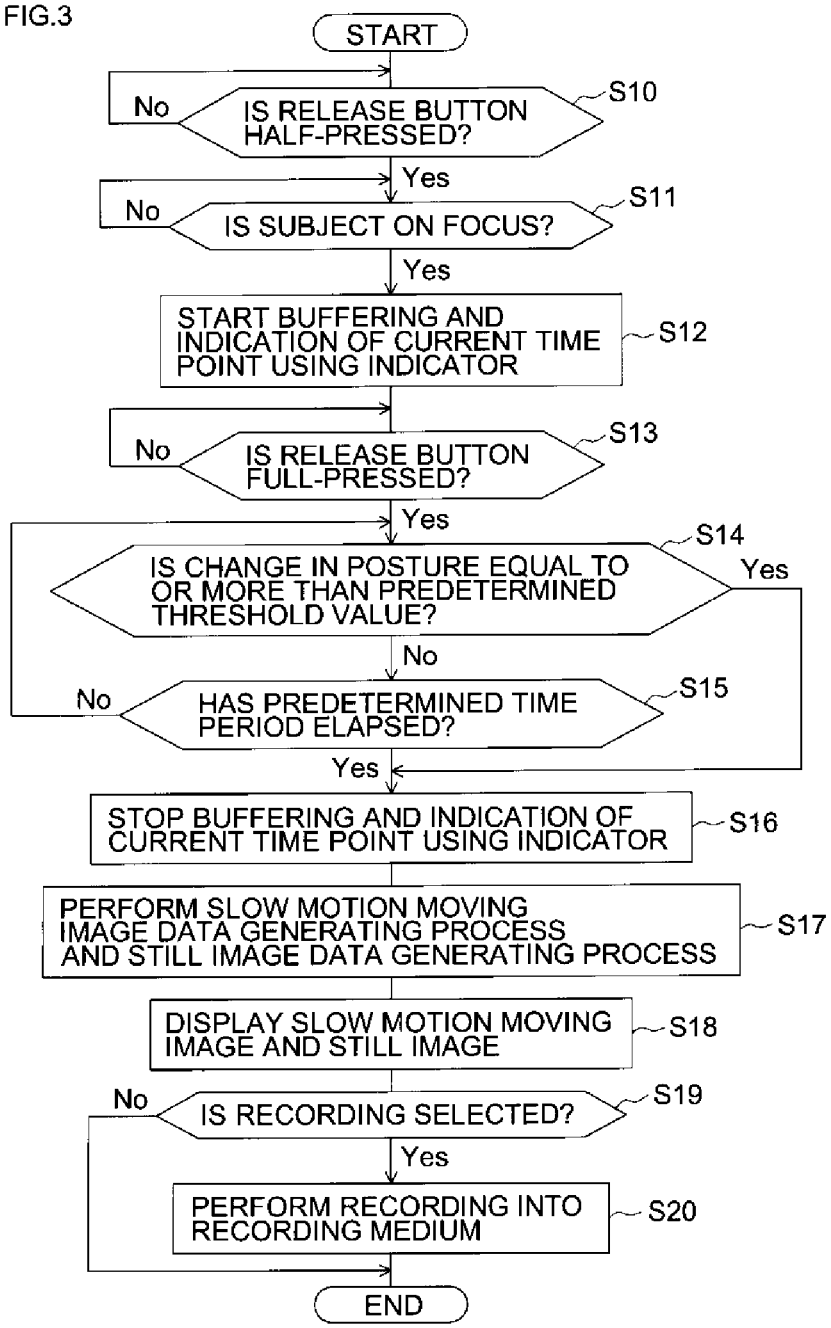
FIG. 3 is a flowchart illustrating a process pertained when the slow motion moving image and a still image are captured in the electronic camera according to the embodiment.

In the electronic camera 2 according to this embodiment, the slow moving image data that is to be played at a second frame rate lower than a first frame rate that represents the number of frame images being stored per unit time in the buffer memory 8 after being output from the imaging sensor 6 is generated. The still image data is generated based on at least one frame image out of the plurality of frame images that constitute the slow moving image data. The generated slow moving image data and the still image data can be recorded in the recording medium 10 in association with each other. Hereinafter, a process performed at the time of capturing the slow moving image and the still image in the electronic camera 2 according to the embodiment will be described with reference to a flowchart illustrated in FIG. 3.

In this embodiment, the slow moving image data is generated based on a plurality of frame images stored in the buffer memory 8 for a time period from a time at which the frame image to become the still image data is stored in the buffer memory 8 to the beginning of a first predetermined time period, and a plurality of frame images stored in the buffer memory 8 for a time period, that is, until the end of a second predetermined time period after the frame image to become the still image is stored in the buffer memory 8. That is, the slow moving image data is generated based on the plurality of frame images stored in the buffer memory 8 during a predetermined time period (the first predetermined time period+the second predetermined time period), and the still image data is generated based on the frame image stored in the buffer memory 8 at the ending time of the first predetermined time period (that is, the beginning time of the second predetermined time period). Furthermore, the predetermined time period (for example, 1 second or the like), the first predetermined time period (for example, 0.6 second or the like), and the second predetermined time period (for example, 0.4 second or the like) are set in advance and stored in a memory (not shown) in a rewritable manner. In other words, the slow moving image data is generated based on the plurality of frame images stored from the beginning of the first predetermined time period, which begins before the frame image to become the still image data is stored in the buffer memory 8, until the end of the second predetermined time period, which ends after the frame image to become the still image is stored in the buffer memory 8.

Figure 4:
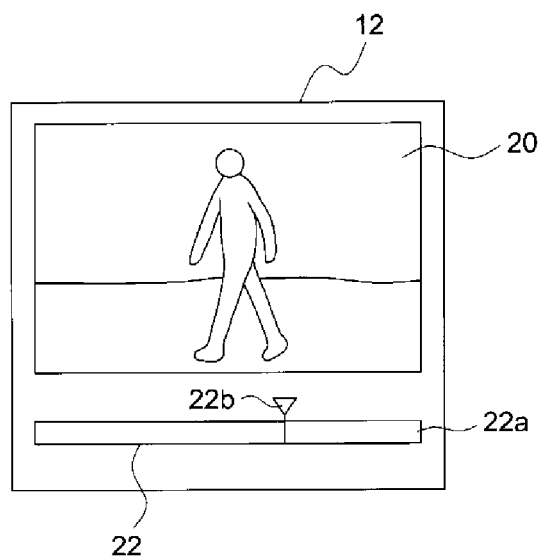
FIG. 4 is a diagram illustrating an exemplary display on a display unit.
Figure 5:
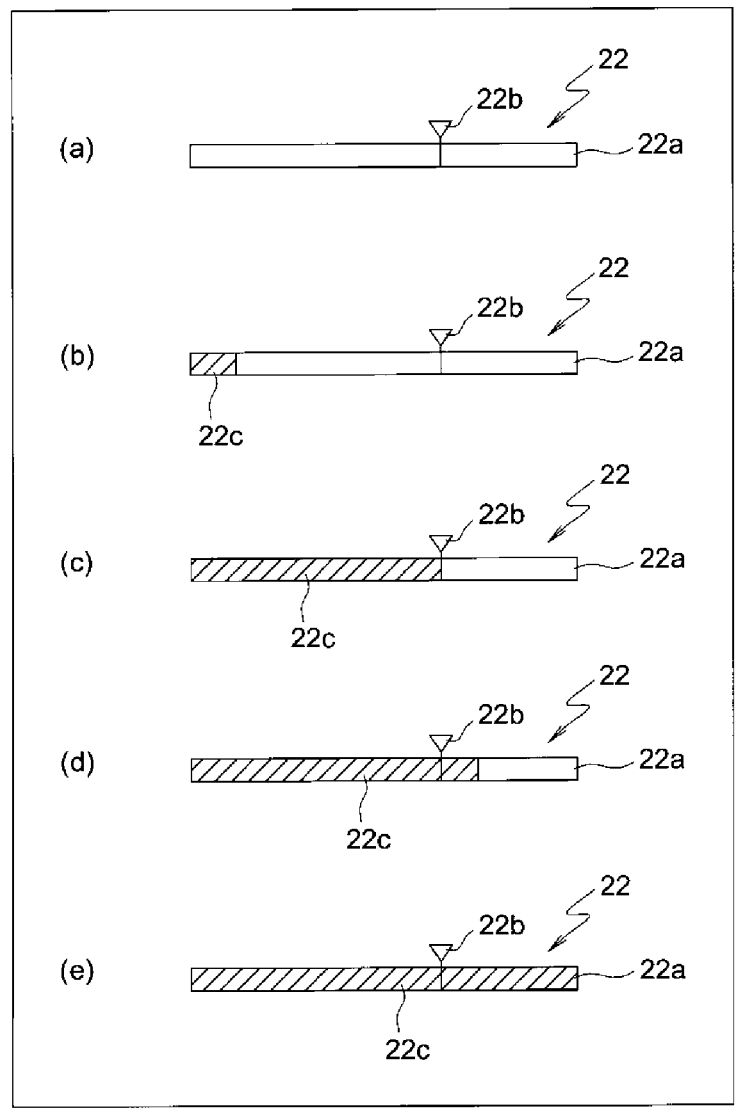
FIG. 5 is a diagram illustrating an exemplary indication by an indicator.

First, when a user operates the command dial to set the slow motion moving image capturing mode, the control unit 4 switches to the slow motion moving image capturing mode for capturing the slow motion moving image and the still image associated with the slow motion moving image. Then, it is determined whether or not the user has half-pressed the release button (Step S10). When it is determined that the release button is half-pressed in Step S10, the control unit 4 determines that an instruction to prepare generation of the still image data and an instruction to generate the slow moving image data are given. Accordingly, as shown in FIG. 4, the control unit 4 performs control such that the display unit 12 displays the through image 20 and the indicator 22 thereon, and a focus lens (not shown) or the like is driven to move a focus position toward a main subject for the main subject in the through image 20 to be on focus. Then, it is determined whether or not the main subject is on focus (Step S11). The indicator 22 has a function of indicating to the user where the current time point is within the time span between the beginning and end (that is, over the entire period during which the slow moving image is generated) of the predetermined time period (in other words, indicating where the current time point is within the time span between the beginning and end of the first predetermined time period and where the current time point is within the time span between the beginning and end of the second predetermined time period). Referring to FIG. 4, a bar 22c (described below, see FIG. 5) inside a frame 22a of the indicator 22 is not displayed. No display of the bar 22c means an operation stage before the beginning of the first and second predetermined time periods. A mark 22b represents the ending time of the first predetermined time period (the beginning time of the second predetermined time period), that is, the mark 22b means that the full-pressing operation of the release button in Step S13 to be described below is executed. The indicator 22 will be described below in detail.

When it is determined that the main subject is on focus in Step S11 (Yes in step S11), the control unit 4 pertains control such that the capturing of the slow moving image is started, that is, the buffering into the buffer memory 8 and the indication of the current time point by the indicator 22 are started (step S12). Specifically, as described above, the control unit 4 performs control such that the plurality of frame images F1, . . . , and Fn . . . (see FIG. 2) produced based on the imaging signal, which is output from the imaging sensor 6 in synchronization with the moving image cycle, start to be stored in the predetermined addresses in the buffer memory 8. Next, when the buffering into the buffer memory 8 is started, the control unit 4 starts control of causing the indicator 22 to indicate the progress of buffering, that is, which time point of buffering between the beginning and end of the predetermined time period (the first predetermined time period) is being executed at the current time point. That is, at the time prior to the beginning of the predetermined time period (the first predetermined time period), as shown in FIGS. 4 and 5(a), nothing is displayed inside the frame 22a of the indicator 22. However, when the buffering is started, as shown in FIG. 5(b), the display of the bar 22c is started from the left end of the frame 22a. As the frame images stored in the buffer memory 8 increase in number (with time), as shown in FIG. 5(c), the bar 22c extends toward the right side of the frame 22a.

In this embodiment, when the release button is full-pressed by the user (Yes in Step S13 to be described below), the still image data is generated based on the frame image that is based on the imaging signal output from the imaging sensor 6. Accordingly, after n frame images are stored in the buffer memory 8 until the release button is full-pressed by the user from the time at which the first predetermined time period ends, a process is repeatedly performed in which the oldest frame image in the buffer memory 8 is deleted each time the frame image is output, and the output frame image (the newest frame image) is stored in the buffer memory 8. In this case, the bar 22c inside the frame 22a does not show any change as being in the state illustrated in FIG. 5(c). That is, the bar 22c extends up to the position of the mark 22b that represents the time (the end of the first predetermined time period and the beginning of the second predetermined time period) at which the still image is captured, but does not extend during a period in which the release button is not full-pressed by the user.

Next, in the middle of the process in which storage of the frame image into the buffer memory 8 is repeatedly performed after the first predetermined time period has elapsed, the control unit 4 determines whether or not the release button is full-pressed by the user (Step S13). When it is determined that the release button is full-pressed by the user in Step S13, the control unit 4 determines that a still image capturing instruction to generate the still image data is input. In this case, the control unit 4 causes the second predetermined time period (ending the counting for the first predetermined time period) to begin to elapse, and causes the bar 22c to extend toward the right side of the frame 22a with time as illustrated in FIG. 5(d). In this way, by displaying the bar 22c that indicates where a current time point is between the beginning and end of the predetermined time period (the second predetermined time period) on the display unit 12, it is possible to indicate to the user that the capturing of the slow moving image is not completed. Next, the control unit 4 acquires information related to the change in the attitude of the electronic camera 2 relative to the main subject detected by the detection unit 16, and determines whether or not the acquired change in the attitude of the electronic camera 2 is equal to or more than a predetermined threshold value (Step S14). That is, when it is determined that the user has full-pressed the release button or the like for example, it is further determined whether or not the attitude of the electronic camera 2 which is posed during the image-capturing is considerably changed, for example, to an attitude of the electronic camera 2 at the state of not capturing. The predetermined threshold value is set in advance to an appropriate value and stored in a memory (not shown) or the like.

When it is determined that the change in the attitude of the electronic camera 2 is not equal to or more than the predetermined threshold value in Step S14 (No in Step S14), the control unit 4 determines whether or not the predetermined time period (the second predetermined time period) has elapsed (Step S15). That is, it is determined whether or not the storage of the frame images necessary to generate the slow moving image data into the buffer memory 8 is completed after the release button is full-pressed (that is, after the entering of the still image capturing instruction).

When it is determined that the predetermined time period (the second predetermined time period) has not yet completely elapsed in Step S15 (No in Step S15), the control unit 4 returns the process to Step S14.

On the other hand, when it is determined that the predetermined time period (the second predetermined time period) has completely elapsed in Step S15 (Yes in Step S15), the control unit 4 determines that the storage of n frame images necessary to generate the slow moving image data into the buffer memory 8 is completed, and thereby ends the buffering into the buffer memory 8 and the indication of the current time point by the indicator 22 (Step S16). At this time, as illustrated in FIG. 2(a), n−p (p is a natural number, n>p) frame images, F2 to F5 . . . , have been stored in the buffer memory 8 over a period from a time prior to the input time TS of the still image capturing instruction to a time prior to the beginning of the first predetermined time period, and p frame images, . . . Fn and Fn+1, have been stored over a period from the input time TS of the still image capturing instruction to the ending time of the second predetermined time period. In Step S17 described later, the slow moving image data is generated based on the n frame images F2 to Fn+1. FIG. 5(e) illustrates the state of the bar 22c inside the frame 22a of the indicator 22 after the predetermined time period (the second predetermined time period) has completely elapsed.

Further, when it is determined that the change in the attitude of the electronic camera 2 is equal to or more the predetermined threshold value in Step S14 (Yes in Step S14), the control unit 4 determines that the attitude of the electronic camera 2 is considerably changed, and ends the buffering into the buffer memory 8 and the indication of the current time point by the indicator 22 even in a case where the predetermined time period (the second predetermined time period) has not yet elapsed (Step S16). That is, even in a case where the bar 22c inside the frame 22a of the indicator 22 is not in the state of FIG. 5(e) but in the state of FIG. 5(d), the time at which it is determined that the change in the attitude of the electronic camera 2 is equal to or more than the predetermined threshold value is used as the end point of the predetermined time period (the second predetermined time period). In this case, the slow moving image data is generated in Step S17 based on the frame images stored in the buffer memory 8, where the frame images include n−p (p is a natural number, n>p) frame images F2 to F5 . . . stored during a period from a time prior to the input time TS of the still image capturing instruction to a time prior to the beginning of the first predetermined time period, and frame images, of which the number is smaller than p, stored during a period from the input time TS of the still image capturing instruction to the time at which it is determined that the change in the attitude of the electronic camera 2 is equal to or more than the predetermined threshold value, that is, the frame images F2 to F5 . . . that are smaller in number than n.

Next, the control unit 4 performs a slow moving image data generating process and a still image data generating process based on the plurality of frame images stored in the buffer memory 8 (Step S17). The slow moving image data generating process will be described first. The control unit 4 reads the frame images F2 to F5 . . . out of the buffer memory 8 at a second frame rate (for example, 24 frames/second or the like which is equal to 1/2.5, that is, 0.4, of a first frame rate) lower than the first frame rate (for example, 60 frames/second or the like) which is the same as a frame rate (image-capturing frame rate) at which the frame images are output from the imaging sensor 6. That is, the frame image F2 stored in the buffer memory 8 at a time T1 (for example 1/60 second or the like) as illustrated in FIG. 2(a) is read out of the buffer memory 8 at a time T2 (for example, 1/24 second) as illustrated in FIG. 2(b). Then the read frame images F2 to F5 . . . are subjected to a resizing process (resizing from a high resolution to a low resolution) of resizing the frame image to have a resolution suitable for a moving image, performed by the reduction circuit (not shown) in the control unit 4, and the moving-image image process (inclusive of the image compression process), performed by the moving image signal processing circuit (not shown) in the control unit 4 so as to generate the slow moving image data. The value of the second frame rate is set in advance, and stored in a memory (not shown) in a rewritable manner.

Next, the still image data generating process will be described. The control unit 4 reads the frame images stored in the buffer memory 8 at the time TS, at which the still image capturing instruction is input, out of the buffer memory 8. Next, the still image data is generated by subjecting the read frame image to the still-image image process (inclusive of the still image compression process) performed by the still image signal processing circuit (not shown) provided separately from the moving image signal processing circuit in the control unit 4. In this embodiment, since the frame images, each having pixels more than those required for the standard of HDTV, that is, high resolution frame images are stored in the buffer memory 8, it is possible to obtain the still image data of high resolution. In addition, the number of pixels of the generated still image data is larger than that of the generated slow moving image data.

Next, when an instruction to display the slow moving image and the still image on the display unit 12 is entered via the operation unit 14 by the user, the control unit 4 causes the display unit 12 to display the preview of the slow moving image that is based on the slow moving image data generated in Step S17. Then the control unit 4 causes the display unit 12 to display the preview of the still image that is based on the still image data generated in Step S17 for several seconds (which are set in advance) (Step S18).

Next, the control unit 4 causes the display unit 12 to display a selection screen that allows the user to select whether or not to record at least either one of the slow moving image data and the still image data generated in Step S17 in the recording medium 10 before recording into the recording medium 10 is started. The selection screen includes a description informing that one of the items "record only slow moving image data", "record only still image data", "record both slow moving image data and still image data", and "record neither slow moving image data nor still image data" can be selected, icons, and the like. The control unit 4 determines whether or not the user has selected to record at least any one of the slow moving image data and the still image data in the recording medium 10 using the selection screen (Step S19).

When it is determined that the user has selected to record at least either one of the slow moving image data and the still image data in the recording medium 10 in Step S19 (Yes in Step S19), that is, when any one of the items "record only slow moving image data", "record only still image data", and "record both slow moving image data and still image data" is selected by the user, the control unit 4 records at least any one of the slow moving image data and the still image data in the recording medium 10 according to the selection by the user (Step S20). Specifically, when the item "record only slow moving image data" is selected, only the slow moving image data is recorded (the still image data is deleted). When the item "record only still image data" is selected, only the still image data is recorded (the slow moving image data is deleted). When the item "record both slow moving image data and still image data" is selected, both of the slow moving image data and still image data are recorded. In a case where the slow moving image data is to be recorded in the recording medium 10, the slow moving image data generated in Step S17 is subjected to the moving image compression process performed by the moving image compression circuit (not shown) in the control unit 4 and the compressed slow moving image data is recorded in the recording medium 10. In a case where the still image data is to be recorded in the recording medium 10, the still image data generated in Step S17 is subjected to the still image compression process performed by the still image signal processing circuit (not shown) in the control unit 4 and then the compressed still image data is recorded in the recording medium 10. In a case where both of the slow moving image data and the still image data are to be recorded in the recording medium 10, both data are recorded after being associated with each other (after being added with information (date and time at which an image is captured, identification number, or the like) indicating the association between both data).

Since the slow moving image data and the still image data are recorded in association with each other, for example, it is possible to display information informing that the still image linked to the slow moving image exists, during the playing of the slow moving image and to display intonation informing that the slow moving image linked to the still image exists, during the display of the still image. In addition, when displaying a reduced image (thumbnail image) based on reduction image data of the still image that is generated at the time of generating the still image data and recorded in a state of being added to the still image data, it is possible to display information informing that the related slow moving image exists. Further, when the user enters an instruction to play the related slow moving image (or still image) using the operation unit 14 during the playing of the still image (or the slow moving image), the slow moving image (or the still image) can be easily played.

On the other hand, when it is determined that the user has selected not to record at least one of the slow moving image data and the still image data in the recording medium 10 in Step S19 (No in Step S19), that is, when it is determined that the user has selected the item "record neither slow moving image data nor still image data", the control unit 4 deletes both of the slow moving image data and the still image data generated in Step S17 without recording them in the recording medium 10 in accordance with the selection of the user.

In Step S18, when displaying the selection screen for selecting whether or not at least any one of the slow moving image data and the still image data is to be recorded in the recording medium 10 after the slow moving image and the still image are displayed for preview on the display unit 12, or after displaying the selection screen, the invention may employ a structure that can change the value of the second frame rate and generate the slow moving image again at the changed second frame rate. This case effectively applies to a case in which the user wants to further slow down or slightly increase the playing speed of the slow moving image which is to be displayed after the user has watched the image once through the preview. Specifically, the control unit 4 returns the process to Step S17 when the value of the second frame rate is changed by the user through the operation of the operation unit 14, so that a series of frame images stored in the buffer memory 8 is read again at the changed second frame rate, and the slow moving image is played based on the frame images that are read. After that, the slow moving image is displayed on the displayed unit 12 at the changed frame rate for preview, and a confirmation screen (selection screen) for confirming whether to record the slow moving image data having the changed frame rate in the recording medium 10 is displayed on the display unit 12. When the user performs an operation of confirming the record of the changed slow moving image using the operation unit 14, the slow moving image data generated with use of the changed second frame rate is recorded in the recording medium 10.

According to the electronic camera 2 of the embodiment, it is possible to capture a slow moving image having an impressive video effect, high resolution, and extreme precision, and to capture a still image having high resolution and extreme precision in the middle of capturing the slow moving image. That is, since the frame images that constitute a slow moving image are stored with a high resolution in the buffer memory 8, it is possible to generate the slow moving image data with high resolution and extreme precision. In addition, since the still image data is generated based on the high resolution frame image, it is possible to generate the still image data with high resolution and extreme precision (for example, the still image data having a resolution higher than that of the slow moving image data). Furthermore, since it is possible to indicate to a user a time period (predetermined time period) during which the frame images for generating the slow moving image data are being buffered using the indicator 22, the user can quickly check whether or not the slow moving image is being captured. Accordingly, it is possible to suppress a significant change in the attitude of the electronic camera 2 relative to the subject in the middle of capturing the slow moving image and thus it is possible to generate the slow moving image data with good precision. Moreover, it is possible to control the ending time of the predetermined time period (the second predetermined time period) based on the detection result from the detection unit 16, and to suspend the buffering of the frame images when the attitude of the electronic camera 2 is considerably changed. Accordingly, it is possible to generate the slow moving image data with good precision which is obtained before the attitude of the electronic camera 2 is considerably changed.

In the above embodiment, when the predetermined time period (the second predetermined time period) that is set in advance has elapsed, or when the change in the attitude of the electronic camera 2 relative to the main subject is equal to or more than the threshold value, the buffering into the buffer memory 8 and the indication of the current time point by the indicator 22 end. However, a configuration may be employed in which the buffering into the buffer memory 8 and the indication of the current time point by the indicator 22 end when it is determined that the release button is full-pressed in a state in which the frame images are being sequentially stored in the buffer memory 8.

In the above embodiment, a piece of still image data is generated based on one frame image stored in the buffer memory 8 when it is determined that the release button is full-pressed, but two or more pieces of still image data may be generated based on two or more frame images. Alternatively, the still image data may be generated based on the frame image stored in the buffer memory 8 before or after it is determined that the release button is full-pressed. In addition, the still image data may be generated based on the frame image stored in the buffer memory 8 when the release button is not full-pressed (for example, in a case where a best shot is made when the release button is not full-pressed or the like). In this case, the frame images stored in the buffer memory 8 are displayed on the display unit 12 for example so that the user can select at least one frame image to be recorded as the still image data, and the still image data is generated based on the selected frame image.

In the above embodiment, the slow moving image data is generated by reading, at the second frame rate, the frame images which are stored at the first frame rate in the buffer memory 8. However, a configuration may be employed in which the moving image data is generated by reading the frame images at the first frame rate and the slow moving image data is generated by adding information instructing to play back the moving image at the second frame rate to the generated moving image data.

Figure 6:
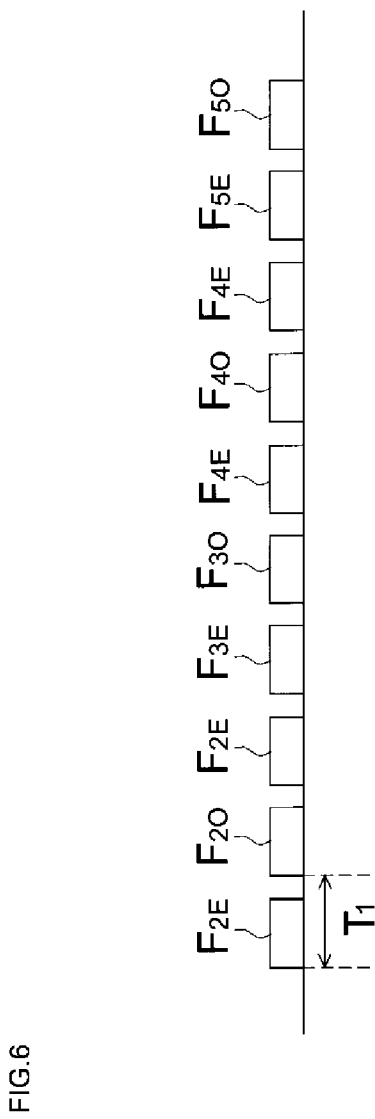
FIG. 6 is an explanatory diagram illustrating another example of the frame rate for recording the slow motion moving image in the recording medium at the time of capturing the slow motion moving image.

In the above embodiment, the frame images F2, . . . , Fn+1 stored in the buffer memory 8 for the time period T1 as illustrated in FIG. 2(*a*) are read out of the buffer memory 8 for the time period T2 in a non-interlace manner as illustrated in FIG. 2(*b*). However, the invention may be configured such that the frame images F2 to Fn+1 may be read in the interlace manner. For example, as shown in FIG. 6, one field (hereinafter, referred to as a first field) F2E obtained by diving the frame image F2 into two fields is read for the time period T1 and then the other field (hereinafter, referred to as a second field) F2O is read for the time period T1. The first field F2E is a field configured by only even-numbered lines of the frame image F2 for example, and the second field F2O is a field configured by only odd-numbered lines of the frame image F2. Subsequently, as shown in FIG. 6, after the first field F2E is read again for the time period T1, one field F3E of the frame image F3 obtained by diving the frame image F3 into two fields is read for the time period T1 and then the other field F3O is read for the time period T1. Through the similar reading operation, that is, as shown in FIG. 6, a field F4E of the frame image F4 obtained by diving the frame image F4 into two fields is read, the other field F4O is read, the field F4E is read again, and a field F5E obtained by diving the frame image F5 into two fields is read, and the other field F5O of the frame image is read. In this way, the reading operation is repeated sequentially for the frame images. As a result, it is possible to generate the slow moving image data at the second frame rate that is 1/2.5 (that is, 0.4) of the first frame rate.

The above-described embodiment is provided for easy understanding of the invention and thus is not construed to limit the invention. Accordingly, each element disclosed in the above embodiment includes design modifications and equivalents within the technical scope of the invention.

The invention claimed is:

1. An electronic device comprising:
   an imaging sensor that images a subject and sequentially outputs image data;
   an operating portion that receives an imaging instruction; and
   a display portion that displays a moving image and a still image based on (i) first image data output by imaging before receiving the imaging instruction and (ii) second image data output by imaging after receiving the imaging instruction.

2. The electronic device according to claim 1, wherein the display portion displays the moving image and the still image when a display instruction is received by a user operation.

3. The electronic device according to claim 1, wherein the display portion displays the still image after displaying the moving image.

4. The electronic device according to claim 1, wherein the display portion displays the moving image and the still image based on (i) first image data output by imaging during a first specified time set in advance before receiving the imaging instruction and (ii) second image data output by imaging during a second specified time set in advance after receiving the imaging instruction.

5. The electronic device according to claim 1, further comprising:
   a buffer memory that starts buffering frame image data after receiving instruction by a user operation.

6. An electronic device comprising:
   an imaging sensor that images a subject and sequentially outputs image data;
   an operating portion that receives an imaging instruction; and
   a generation portion that generates a moving image and a still image based on (i) first image data output by imaging before receiving the imaging instruction and (ii) second image data output by imaging after receiving the imaging instruction.

7. The electronic device according to claim 6, further comprising:
   a display portion that displays the moving image and the still image.

8. The electronic device according to claim 7, wherein the display portion displays the moving image and the still image when a display instruction is received by a user operation.

9. The electronic device according to claim 7, wherein the display portion displays the still image after displaying the moving image.

10. The electronic device according to claim 7, wherein the display portion displays the moving image and the still image based on (i) first image data output by imaging during a first specified time set in advance before receiving the imaging instruction and (ii) second image data output by imaging during a second specified time set in advance after receiving the imaging instruction.

11. The electronic device according to claim 7, further comprising:
    a buffer memory that starts buffering frame image data after receiving instruction by a user operation.

* * * * *